Patented Dec. 26, 1933

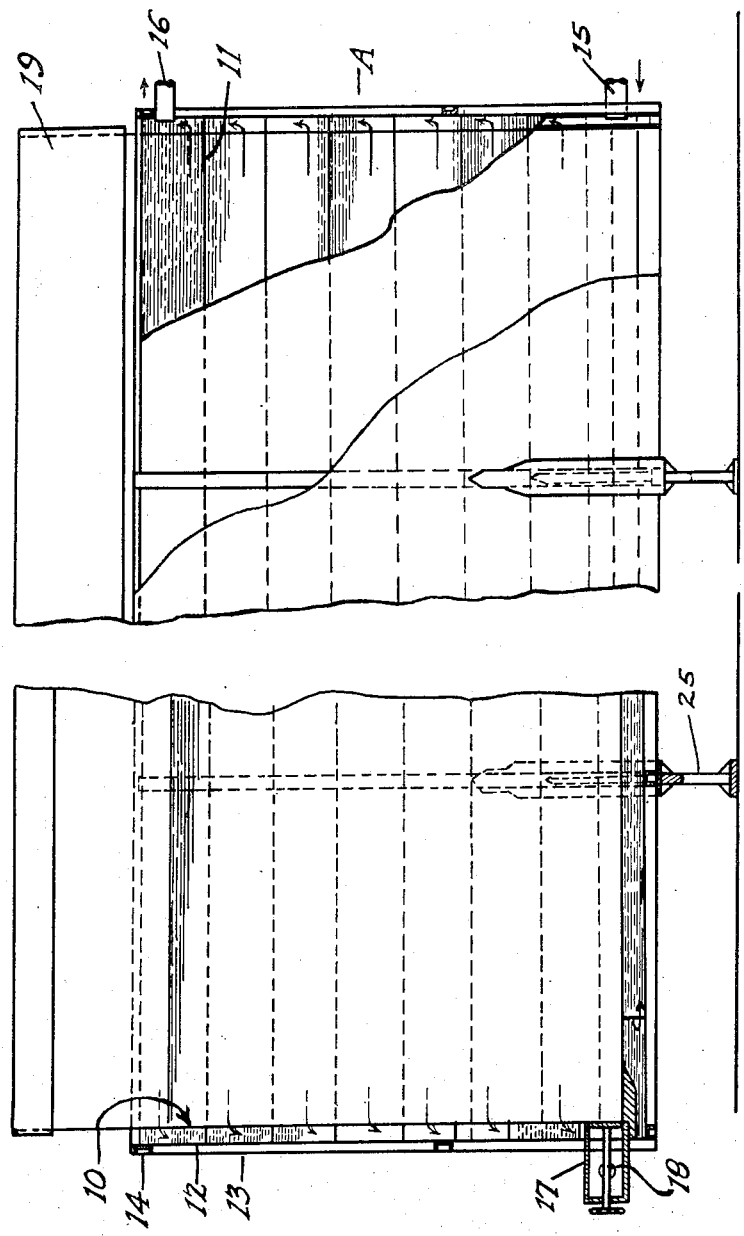

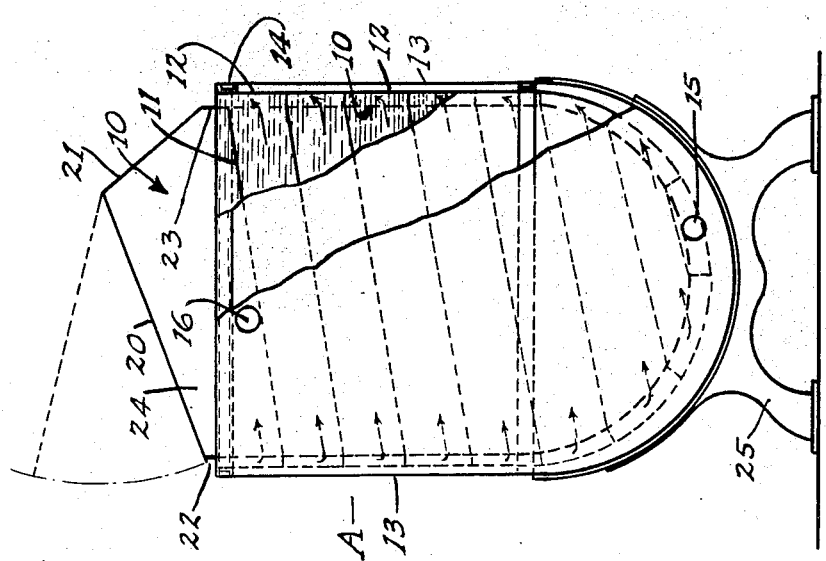
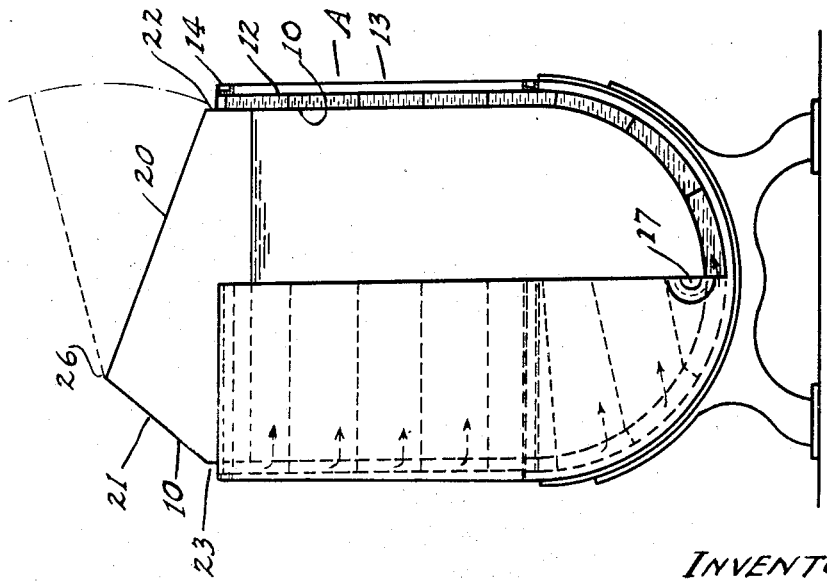

1,941,329

UNITED STATES PATENT OFFICE 1,941,329

PASTEURIZER

Benoit Trudel, Montreal, Quebec, Canada, assignor to B. Trudel & Cie. Ltee., Montreal, Quebec, Canada Application August 24, 1931. Serial No. 559,049

1 Claim. (Cl. 257—208)

This invention relates to improvements in pasteurizers and the objects of the invention are to improve the efficiency of the machine, to permit of liquid being or to be pasteurized being held at the proper temperature, to allow the heating or cooling fluid being circulated around the pasteurizer; to so construct the machine that the interior will be smooth and capable of being kept in a clean and sanitary condition; to provide means whereby the cooling or heating fluids will be maintained for the proper length of time in contact with the wall of the pasteurizer, so that they may effectively give up or receive heat therefrom; and generally to adapt the machine to better perform the functions required of it.

So that the nature of my invention will be clearly understood, I have illustrated a preferred embodiment of the same, but I wish it to be understood that I do not limit myself to this precise construction, but reserve the right to modify the same within the scope of my appended claim, in which what I claim as being new is clearly set out.

In the drawings,

Figure 1 is a side elevation, partly sectional, of my improved pasteurizer.

Figure 2 is a half transverse section, half end elevation, of the same.

Figure 3 is an end view of my pasteurizer, part of the wall being broken away to show the circulating path of the cooling or heating fluid.

Like characters of reference refer to like parts in the several figures.

Referring to the drawings,

A represents the pasteurizer comprising an inner container 10, which is formed with a semi-cylindrical lower wall, the upper portion of the container being open. The side, end and bottom walls of this container are provided with fins or ribs 11, which spirally wind around the container. These ribs co-act with a second container 12 which has a semi-cylindrical bottom and the ribs 11 contact with the side, end and bottom walls of the second container so that a continuous path of a spiral nature is provided between the two containers which insures the flow of fluid through this passage-way of a positive and steady nature, so that the fluid will be held for a sufficient period of time in contact with the walls of the inner container 10 and so give up heat thereto or abstract heat therefrom.

I provide a third container 13 which surrounds the second container and is provided with a semi-cylindrical bottom and this container is spaced from the second container by a plurality of channel members 14 and the space formed between the outer container and the second container forms an air jacket, thereby preventing a dissipation of heat or cold from the pasteurizer. This air space between the container 13 and the container 12 can be filled with cork, wood, insulating board or any other insulating material that it is desired to adopt, in order to insure more efficiency in preventing a dissipation of heat or cold from the pasteurizer.

A cooling or heating fluid which is to be circulated around the inner container is admitted to the passage-way between the inner container 10 and the second container 12 through the entrance pipe 15 and after the fluid has circulated right around the inner container it is discharged at the upper end through the exit pipe 16. The function of introducing the cooling fluid through the entrance 15 at the lower end of the pasteurizer is to allow the fluid, when at its proper temperature, to come in contact with the wall of the inner container and so exert its proper action on the fluid which is being pasteurized, that is to say, for instance, if the inner container was half-filled with cream or milk, then if it is to be pasteurized, the hot fluid which would enter the entrance pipe 15 would, when at its hottest temperature, be brought in contact with that portion of the inner container 10 in contact with the body of the milk or cream, so giving up its heat thereto and, in this way, it will be realized there is no dissipation of heat until after the fluid has performed the functions desired of it.

The same thing applies to a cooling fluid being circulated through this passage-way to cool the liquid which is being pasteurized in the machine.

To facilitate withdrawing the pasteurized fluid from the machine, I provide an outlet conduit 17 with a valve 18 therein, so that the pasteurizer may be emptied or drained off when the process of pasteurizing the fluid therein has been completed.

The inner container includes a rounded bottom, a pair of side walls 22, 23 and a pair of end walls 24. The walls 23, 24 extend above the wall 22. The wall 23 has its upper portion above the wall 22 extending inwardly at an inclination, as at 21. Each of the walls 24 has the top edge thereof formed of a pair of oppositely upwardly inclined portions merging into each other at their inner ends, one of said edge portions being of greater length and of less inclination than the other. The inwardly inclined upper portion 21 of the wall 23 registers with the said inclined top edge portions of smallest length of the walls 24. Hinged at its upper end, as at 26 to the upper end of portion 21 and seating upon the said inclined top edge portions of greatest length of the walls 24 and upon the top edge of wall 22 is a closure 20.

A cover 19 is mounted on the upper end of the inner container and is spaced from the other container.

The pasteurizer is mounted on a suitable stand or brackets 25.

When a liquid, such as milk or cream, is to be pasteurized, it is delivered into the inner container 10 and the cover 19 is adjusted preparatory to starting the pasteurizing process. A hot fluid, such as water, is then delivered through the inlet pipe 15 and circulated upwards through the winding passage-way between the walls of the inner container and the second container and, during its passage, this water gives up its heat to the milk or cream being pasteurized.

The milk or cream is kept in a state of agitation by paddles or screws, which are not shown, but which maintain the cream or milk in the proper condition to take up the heat from the circulating liquid around the inner container 10.

When the pasteurizing has been completed and it is desired to cool off the milk or cream, then a cooling fluid may be delivered through the pipe 15 and circulated through the winding passage-way and be discharged through the outlet 16. The outer air jacket between the outer container 13 and the second container 12 is to prevent any loss of heat from the circulating fluid, so that all the heat from the circulating fluid will be given to the milk or cream within the pasteurizer.

While I have referred to circulating heating fluid, it will be understood that water will generally be used, but the circulation and temperature of the water may be controlled by means of steam jets, not shown and which may be located anywhere on the pasteurizer to give the proper desired effect. The steam will be supplied from any suitable source of power and the controlling of the steam will be under the control of the operator of the pasteurizer.

I may use a circulating pump to circulate the heated water, if such is found advisable, instead of the steam jet above referred to.

I would also like to emphasize that the pasteurizer may assume a different shape from that illustrated in the drawings, that is to say, it might be more or less of an elliptical nature, cylindrical, rectangular, or any other geometrical figure which will permit of the circulation of the fluid in a manner which I have described, and also of the insulating of the second container from the outer atmosphere.

What I claim as my invention is:

A pasteurizer comprising an inner container formed of a bottom, a pair of side walls, one of greater height than and extending above the other and a pair of end walls corresponding in height to that side wall of greater height and each having its upper terminus formed of a pair of oppositely inclined edge portions merging into each other at their upper ends, said side wall of greatest height having an inwardly inclined upper portion registering with one of the inclined edge portions of each end wall, a closure hinged to the top of said inclined upper portion and seating upon the other of the inclined edge portions of the end walls and upon the top edge of said side wall of smallest height, a spirally arranged continuous fin disposed lengthwise of and having its inner edge abutting the outer face of said bottom and the outer faces of said walls below the top of the said end wall of smallest height, an open top intermediate container encompassing the major portion of said inner container, abutting the outer edge of said fin throughout, having its upper terminus aligning with the top edge of said wall of smallest height and forming in connection with said fin and inner container a heating medium circulating passage of spiral form, an intake and outlet for said passage, an outer container encompassing said intermediate container in spaced relation and having its upper end aligning with the upper terminus of said intermediate container, spacing means between said intermediate and outer containers abutting the latter, disposed at the upper end of and for closing said outer container, a valve controlled outlet means for said inner container extending from the lower end of one of the walls of the latter and through the outer containers, and a removable cover mounted upon the upper end of the inner container and spaced from said other containers.

BENOIT TRUDEL.